No. 741,325. PATENTED OCT. 13, 1903.
S. A. GIBBS.
MOTOR.
APPLICATION FILED JAN. 5, 1903.
NO MODEL. 5 SHEETS—SHEET 1.
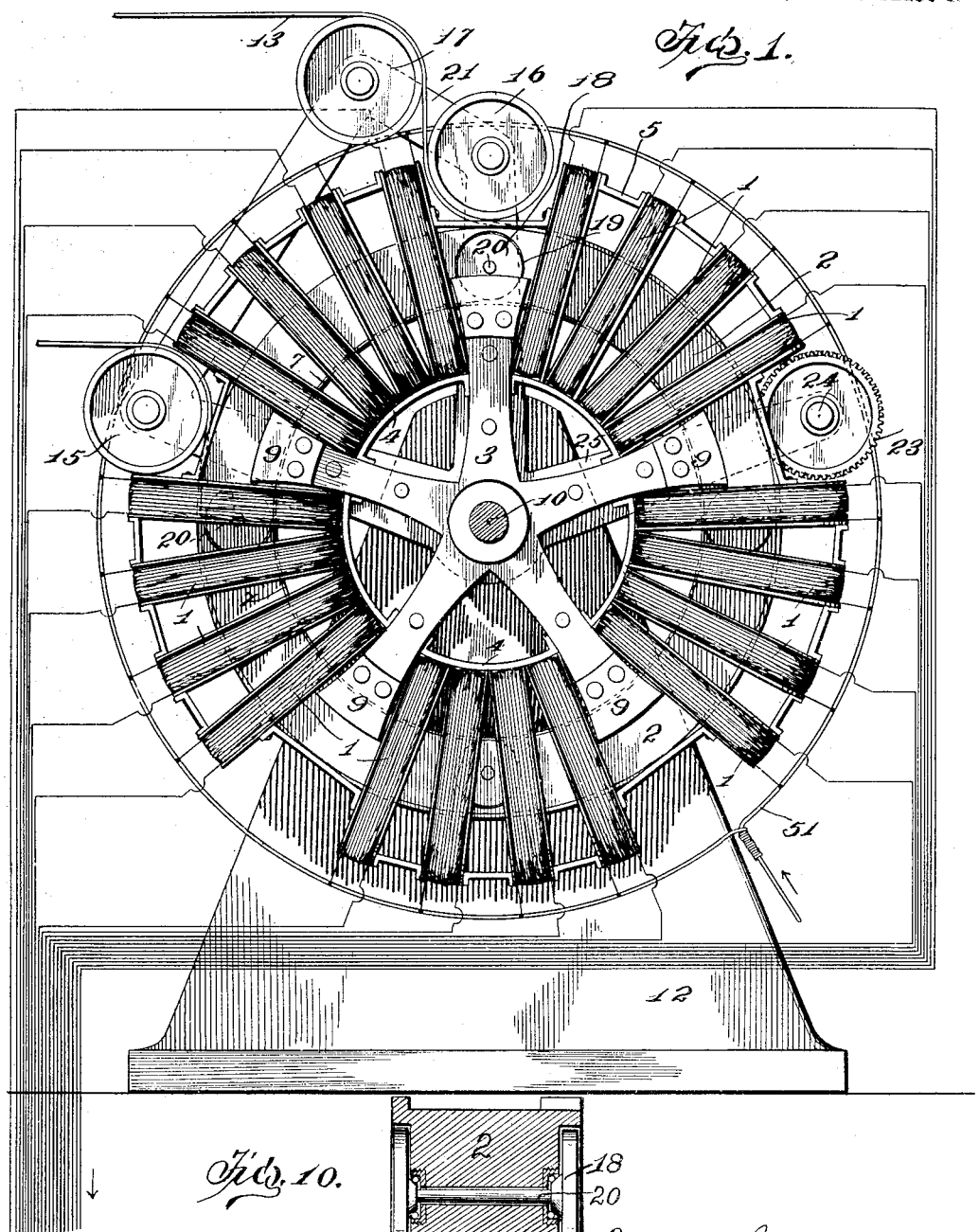

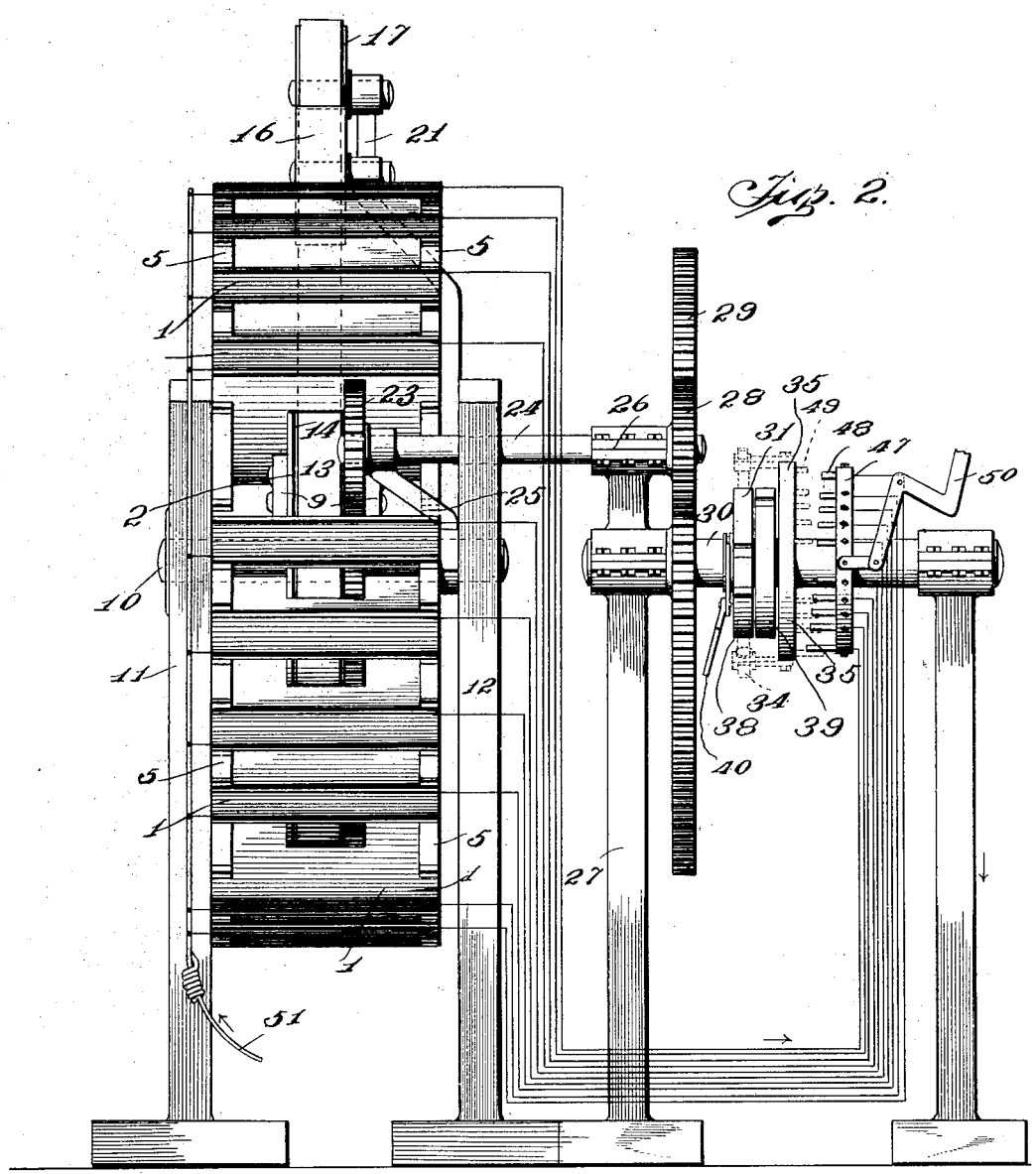

No. 741,325. PATENTED OCT. 13, 1903.
S. A. GIBBS.
MOTOR.
APPLICATION FILED JAN. 5, 1903.
NO MODEL. 5 SHEETS—SHEET 3.
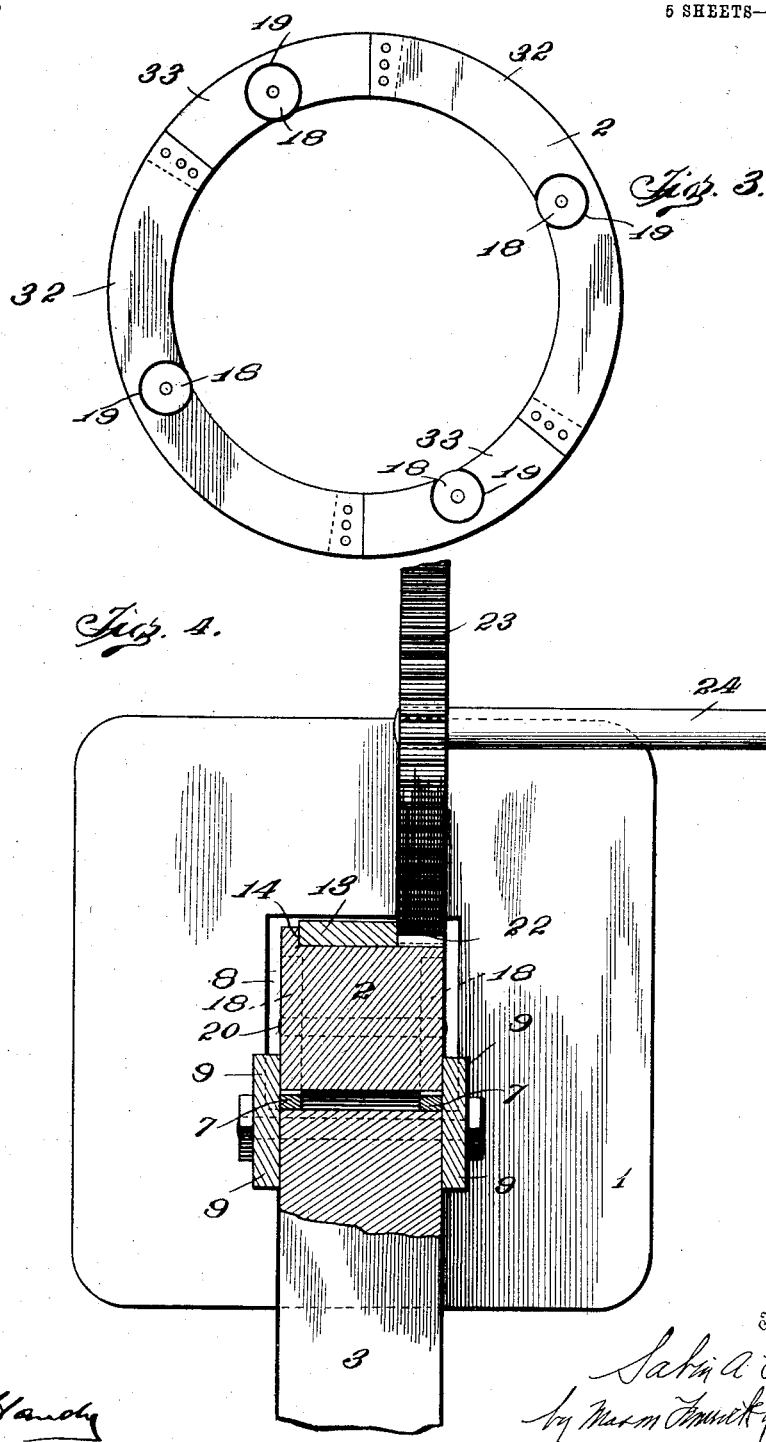

No. 741,325. PATENTED OCT. 13, 1903.
S. A. GIBBS.
MOTOR.
APPLICATION FILED JAN. 5, 1903.
NO MODEL. 5 SHEETS—SHEET 4.

No. 741,325. PATENTED OCT. 13, 1903.
S. A. GIBBS.
MOTOR.
APPLICATION FILED JAN. 5, 1903.
NO MODEL. 5 SHEETS—SHEET 5.

Witnesses
L. G. Handy
Cassell Severance

Inventor
Sam A. Gibbs
By Masey Fenwick Lawrence
his Attorneys

No. 741,325.

Patented October 13, 1903.

UNITED STATES PATENT OFFICE.

SABIN A. GIBBS, OF TACOMA, WASHINGTON.

MOTOR.

SPECIFICATION forming part of Letters Patent No. 741,325, dated October 13, 1903.

Application filed January 5, 1903. Serial No. 137,905. (No model.)

*To all whom it may concern:*

Be it known that I, SABIN A. GIBBS, a citizen of the United States, residing at Tacoma, in the county of Pierce and State of Washington, have invented certain new and useful Improvements in Motors; and I do hereby declare the following to be a full, clear, and exact description of the invention, such as will enable others skilled in the art to which it appertains to make and use the same.

This invention relates to improvements in motors, and particularly to electrically-operated devices; and it consists in a motor comprising a number of coils and a rotating member arranged to travel through said coils, means extending through the said coils for guiding and supporting the rotating member, together with means for energizing the coils at suitable times to cause the rotation of such member.

It further consists in a motor which is essentially a solenoid-motor, being provided with a number of hollow coils and having a circular core or plunger traveling through the said hollow coils, a track for said core passing through said coils, the said plunger being actuated by the energizing of one or more of the coils successively, and means for transmitting motion from the said core or plunger to any suitable point for operating other devices.

It further consists in certain other novel constructions, combinations, and arrangements of parts, as will be hereinafter fully described and claimed.

Figure 5:
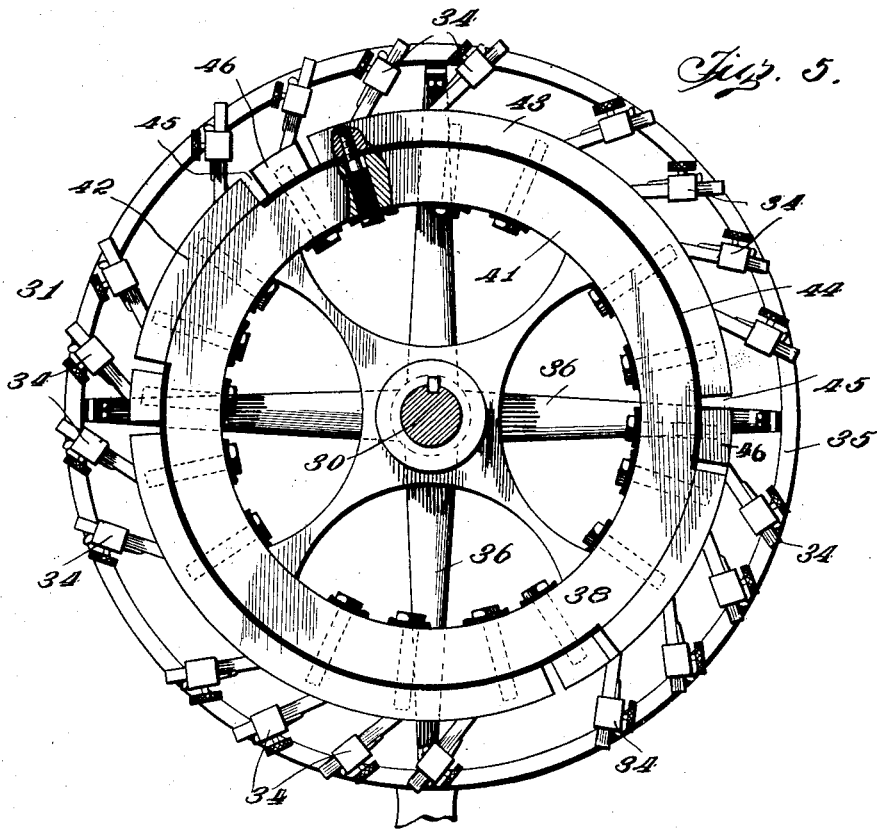
Figure 6:
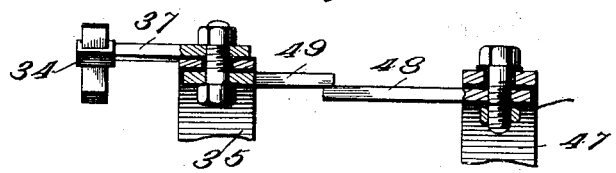
Figure 7:
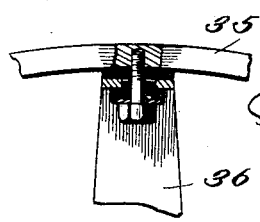
Figure 8:
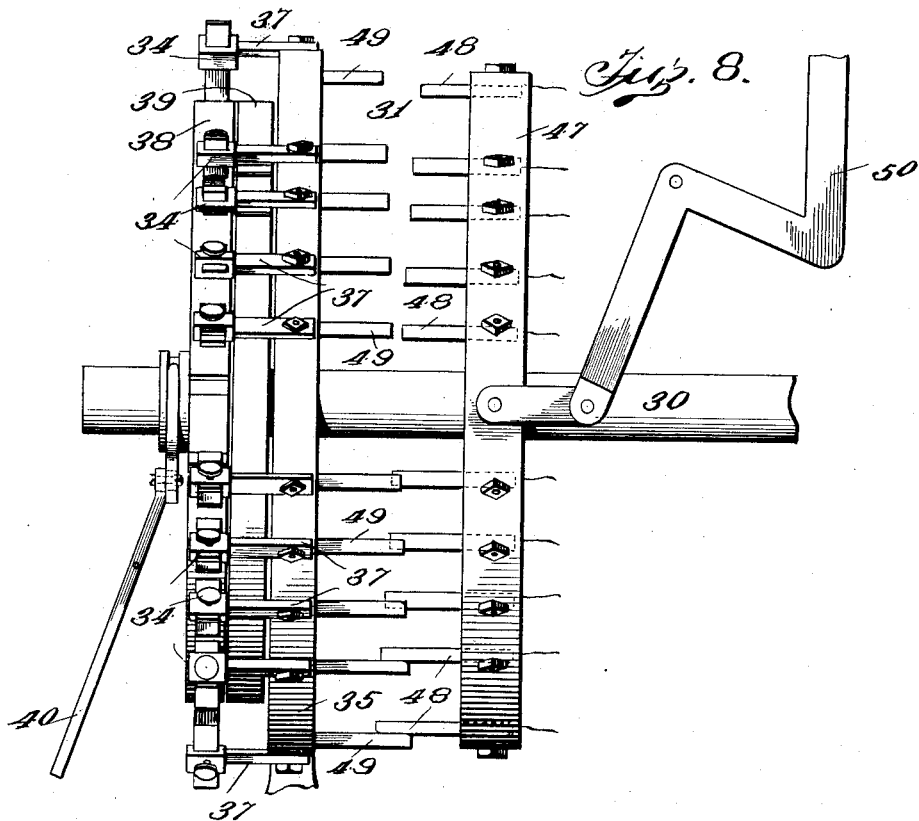
Figure 9:
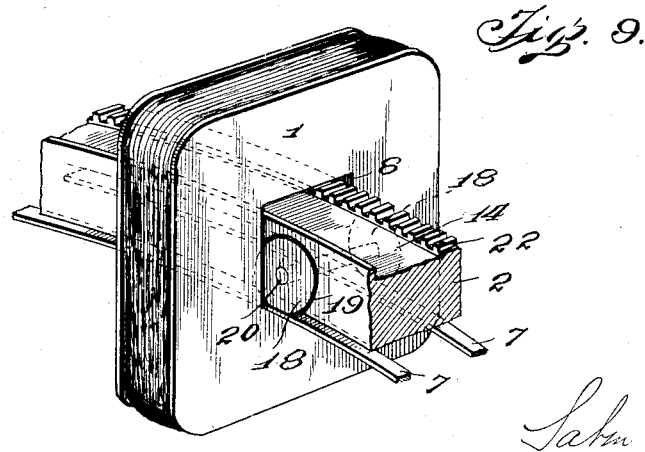

In the accompanying drawings, Figure 1 is a side elevation of a motor constructed in accordance with this invention. Fig. 2 is an end or edge view of the same. Fig. 3 is a side elevation of the traveling core or plunger. Fig. 4 is an enlarged detail sectional view through a portion of said core and illustrating the manner in which it passes through a coil as well as showing the means engaging the periphery of the core for operating other mechanisms. Fig. 5 is a side elevation of the commutator mechanism, showing the brushes engaging the same. Fig. 6 is a detail sectional view through the brush-supporting mechanism and a part of the governing device. Fig. 7 is a detail sectional view showing the means of insulating the brush-supporting ring. Fig. 8 is an edge view of the commutators, brush mechanism, and governing device. Fig. 9 is a perspective view of one of the coils, a portion of the traveling core and its track being shown as extending through said coil. Fig. 10 is a detail transverse sectional view through the core, taken on the line of the axis of one of its pairs of bearing-rolls and showing the ball-bearings used with the same.

The present invention is directed toward the production of motors which are so constructed as to utilize the principle of the solenoid. I am aware that this principle has been used to some extent for the purpose of producing motors; but they have been more or less imperfect and not very practical. By the present invention I am enabled to secure powerful action from an apparatus based on the solenoid principle and yet produce a simple motor which is capable of developing power for various purposes.

The motor is made up of a series of actuating-coils, as 1, which are provided with central apertures and so arranged that a traveling core or plunger 2 can pass through them. The number of coils employed is determined by the strength of the motor desired. The coils are arranged, preferably, radially with respect to the center of the machine and the center of motion of the core 2 and are supported upon a central spider or frame 3. This spider is provided with a suitable number of radiating arms, which extend outwardly to a point near the core 2. Plates, as 4, may be interposed between the arms and the spider 3 for holding the inner edges of the coils in proper position, while the outer edges of the said coils may be braced or secured at a proper position with respect to each other by other brace-plates, as 5. The outer ends of the spider 3 also carry a track or guide mechanism for directing the movement and properly supporting in position the traveling core 2. The track is preferably made in a simple manner and may consist of one or more flat bars or bent rods 7, extending in a curved manner around through the apertures 8 of the coils. The tracks 7 are held against lateral displacement at the ends of the spider-arms by means of blocks 9, which are rigidly secured to said arms on the outer sides of the tracks. The spider 3 is supported by a shaft 10, which preferably projects in both directions therefrom and is supported outside the coils upon standards 11 and 12. These standards support the machine in proper position. The shaft 10 of course does not rotate nor does the spider 3, which is mounted thereon.

The core or traveling plunger 2 is provided with means for imparting motion to a commutator mechanism for controlling the application of energy to the coils and is also provided with suitable means by which it is able to impart motion or power to other machinery. The means shown in the drawings as one simple manner of delivering power from the plunger to other mechanisms consists in a belt 13, which engages an annular recess 14, formed upon the outer periphery of the core 2. This belt passes almost entirely around the core, so as to engage the surface of the said core in a manner to prevent slipping between the core and belt. The belt reaches the core by entering through a space between adjacent coils 1 of the machine, being guided in such entrance by a suitable pulley 15. The belt leaves the core and passes out of the machine at another point between the coils 1, being guided in its exit by pulleys 16 and 17. Both the pulleys 16 and 17 and the pulley 15, above referred to, are mounted upon studs supported by a framing or plate 21, which is secured to the standard 12 and passes down between the edges of the coils and the said standard, as shown in Fig. 1. While the belt may be caused to enter the machine and pass to the traveling core at any point, yet experience shows that by passing the belt into the core at one side, as illustrated in Fig. 1, the tight or pulling side of the belt will tend to support to some extent the weight of the traveling core and reduce its friction in moving over its track and through the coils, while by passing the loose side of the belt out of the top of the machine the belt simply acts upon the core enough at the top to prevent any possibility of the belt slipping with respect to the core.

To still further render the movement of the traveling core free from needless friction, the said core is provided with supporting-wheels, as 18. These wheels are arranged in countersunk recesses 19 upon opposite sides of the core, so that they do not project beyond the side surfaces of said core and will therefore offer no obstruction in passing the blocks 9 as the core passes around upon the spider. The supporting antifriction-wheels 18 are arranged to engage the tracks 7 and travel thereon, thus minimizing the friction between said tracks and the core. The antifriction-wheels 18 are preferably arranged in pairs, being connected by suitable shafts 20, which extend through bearings in the body of the core. Of course it will be understood that I may use antifriction ball-bearings or other devices for still further reducing the friction of these moving parts, if desired. The periphery of the core 2 also carries a circular rack 22, which is engaged by a pinion 23, carried by a shaft 24. The shaft 24 is supported by an arm 25 of the plate 21 and also by a suitable bearing 26 of a standard 27. This shaft and pinion may also be used for communicating motion and power from the movable core to other mechanism. As illustrated in the drawings, it may also be employed for operating a commutator mechanism for regulating the flow of electrical current through the various coils surrounding the core, energizing the proper ones at the proper time. For this purpose the shaft 24 also carries a pinion 28, preferably of the same size as the pinion 23, which meshes with the teeth of a gear-wheel 29, preferably of the same size and diameter as the circular rack upon the periphery of the movable core or plunger 2. By this means the said gear-wheel is always caused to move with exactly the same speed as the core 2. The gear-wheel 29 is carried by a shaft 30, mounted in suitable bearings, which shaft 30 supports a commutator mechanism 31, as will be hereinafter more fully described.

In order to enable the electrically-actuated coils of the motor to impart movement to the traveling core 2, the said core is peculiarly constructed. It is made up of a number of sections, some of which are capable of being attracted by the coils when energized, while other sections are not affected by the energizing of the said coils. The core may be provided with any number of such active sections as well as any number of inactive sections; but for the sake of illustration I have shown in the drawings, as more particularly illustrated in Fig. 3, the said plunger 2 composed of two oppositely-arranged active sections 32 and also two intervening inactive sections 33, making up the entire ring of the core. When making the core of only two active sections, I preferably form the said sections 32 of greater length than the inactive sections 33. Such active sections 32 are preferably formed of soft iron or similar material, upon which the energized coils will act with a strong attraction, while the other sections, 33, may be made of brass or other non-magnetic substance. With the core thus constructed it will be seen that if some of the coils of the motor are energized by an electrical current, the said coils being near one end of one of the soft-iron sections 32, they will attract the said section and tend to draw it within them. As soon as the section has passed into these coils other coils in front of it are then energized by the action of the commutator to further draw the soft-iron core and thus continuously around the circular bearing to give the said core a definite and regular movement. Of course at the same time that some of the coils are operating upon one end of one of the magnetic sections 32 of the core other coils will be energized simultaneously for acting upon the corresponding end of other soft-iron or magnetic sections of the core. It will thus be evident also that by increasing the number of sections 32 and arranging the commutator so as to energize the coils at more frequent intervals a greater pull can be exerted upon the same for increasing the power and efficiency of the machine, all within the spirit of the invention. The principle, however, is fully illustrated as now shown in the drawings, the action being the same whether there are two or more magnetic sections in the core.

In order to control the energizing of the coils 1, each coil is electrically connected with a brush, as 34, which is secured to a supporting-ring 35. The ring 35 is mounted upon a frame or spider 36, carried by the shaft 30, and is prevented in any suitable manner from turning upon said shaft. The brushes 34 are supported on the ring by means of arms or bars 37, projecting from said ring, so that the brushes overhang the periphery of the adjacent commutator mechanism 31. The brushes are adjustably supported in any usual and well-known manner for maintaining their proper engagement with the periphery of the commutator. The commutator mechanism preferably consists of two commutator-rings 38 and 39. The ring 38 is designed for causing the motor to travel in one direction, while the ring 39 is arranged to cause the reversal of the motor. The commutators 38 and 39 are splined to the shafts 30, so as to turn therewith, and are capable of movement back and forth thereon for bringing one or the other into engagement with the brushes. Such movement may be produced by the operation of a lever, as 40, or in any other desired manner. Each commutator is formed with a body-wheel portion 41, upon the periphery of which body portion are active and insulated sections 42 and 43. When the brushes engage the active sections 42, a circuit will be completed through the coils connected with those particular brushes, the said current also passing through the body portion 41 of the commutator, the shaft 30, and its supporting-standard to the ground. The brushes, however, which are in engagement with the insulated sections 43 will not be able to complete a current, and their respective coils will remain deënergized. The sections 43 have a strip of insulation 44 interposed between them and the periphery of the body portion 41, and the screws which hold them in position thereon are also insulated from said body portion, as clearly illustrated in Fig. 5. The active sections 42 are made of sufficient length to always keep a suitable number of coils energized in front of the movement of the core-sections upon which the coils are operating. While the sections can be made of any length so as to engage one or more of the brushes at any time, yet in the machine constructed like that illustrated in the drawings it is preferable to always have about four of such brushes engaging one of the sections 42, while at least two are engaging the other section. At other positions of the commutator three of the brushes will be engaging each of the sections 42, so that about six of the wires will thus be always energized in a machine of the construction and dimensions shown. Of course these dimensions can be varied in accordance with the power and style of the machine without departing from the spirit of the invention. It is necessary, of course, to leave a suitable gap or space, as 45, between the ends of the active and inactive sections 42 and 43 of the commutator, and in order to make a smooth passage for the brushes from one to the other a bridging-block 46 is arranged in the said space, which is also insulated from the wheel-body 41 and is likewise separated by a short space from each of the sections 42 and 43. By this means, while the brush can pass smoothly over the end of one section to the block 46, it cannot carry a current into the same, since the block is insulated, and the block is also so short that only one brush can touch the same at a time. If the end of the inactive section 43 was close to an active section 42, an uneven movement would be given to the motor, since when the brush is passed over from the active section 42 upon the end of the inactive section 43 the inactive section would be momentarily thrown into the circuit and all the brushes engaging the same would likewise receive a portion of the current, and for an instant all the coils connected with said brushes would be energized and then cut out again, so that a jerky movement would be imparted to the motor. The use of wide spaces between the sections 42 and 43, together with the intervening small blocks 46, obviates any such difficulty. The commutator 39 is practically the same as the commutator 38; but their positions differ with respect to the shaft 30, so that the brushes engaging the same will be energized to move the core in opposite directions. The movement of the commutators of course always has a fixed relation to the movement of the core 2 because of the gearing 23, 28, and 29.

In the use of a motor it is always necessary to be able to govern the amount of current passed to the same in accordance with the load which the motor is carrying, and for this purpose a ring 47 is loosely mounted upon the shaft 30 and slidable longitudinally thereon, the said ring carrying a series of laterally-extending contact arms or bars 48. These bars are of different lengths and are designed to operate in conjunction with corresponding bars 49, carried by the other ring, 35. The bars 49 may also be made of varying lengths or all of the same length, if desired. However, either the bars 48 or the bars 49 must be of varying lengths, so that when the ring 47 is brought toward the other ring, 35, the longest bar 48 will engage its corresponding bar 49, thus communicating a current to the said ring 35, which is distributed to all the brushes. To increase the power of this current, ring 47 is still farther pushed toward the ring 35, so as to bring some of the contacts 48 into engagement with the contacts 49. In this manner the strength of the current delivered to the brush-ring can be controlled to a nicety. The bars 48 are of course thoroughly insulated from the ring 47, as clearly shown in Fig. 6. So, also, the bars are insulated from the ring 35, and the arms carrying the brushes 34 are likewise insulated from said ring, but are electrically connected with their proper bars 49. The ring 35 may be insulated from the shaft 30, as shown in Figs. 5 and 7, if desired. The ring 47 may be moved by any suitable lever, as 50, which may be operated by hand or by a governor, in which latter case the movement of the ring 47 will of course be governed automatically by the speed with which the motor is actuated. In wiring the motor a common feed-wire, as 51, leads from any suitable source of electricity to a suitable point adjacent to the coils 1 and a branch wire is led therefrom to each of said coils. A separate wire then connects each of the coils with each of the bars 48 on the governor-ring 47, and when said bars are all in engagement with their corresponding contacts 49 all of the brushes are connected with their respective coils and ready for producing the actuation of said coils under the control of the commutator. If the speed of the machine is too great because of the lightening of the load or the increase of power, the ring 47 will be moved away from the ring 35, so that some of the contacts 48 and 49 will be disengaged, and some of the brushes will thus be cut off from their respective coils, and a less number of coils will therefore be energized for directing the traveling core 2. If it should be desired to govern the movement of the motor in some other manner than that described, the wires from the coils would be connected directly with the brushes. The current passes from the brushes, as above intimated, though the sections 42 of the commutators to the shaft 30 and thence to the ground. From the ground the current is returned through the wire 51, leading to the coils again.

Although I have illustrated and described my invention as applied to a machine like that shown in the drawings, of course I wish it clearly understood that I may vary the parts of the machine, the number of coils, and the number of sections in the traveling core, as well as the number of sections in the commutator, without departing in the least from the spirit of the present invention. I also wish it understood that I may take power from the traveling core either through a belt in the manner similar to that described or from the shaft 24 and the gearing in any well-known or desired manner. While I have shown the motor provided with coils in groups some of which are wider apart than others, yet it will be understood that I can have all of the coils the same distance apart and arrange the belt in a different manner, the said belt approaching and leaving the core through apertures formed in the coils, if necessary, all within the spirit of this invention.

I contemplate running the commutator in oil to prevent, if possible, all sparking, if found desirable.

Having thus fully described my invention, what I claim as new, and desire to secure by Letters Patent, is—

1. A motor, comprising a series of coils, a traveling core passing through said coils, means passing through said coils for guiding the said core, and means for energizing one or more of the coils successively to continue the motion of the core, substantially as described.

2. A motor, comprising a series of coils having central apertures, a core traveling through the center of said coils, means extending through the coils for guiding and supporting said core, means for continually energizing some of the coils in advance of certain sections of the core to exert a continual pull upon the same, and means for taking power from the periphery of the said core, substantially as described.

3. A motor, comprising a series of coils, a circular, continuous core passing through all of said coils, means extending through the coils and between them for guiding and supporting the said core, and means for energizing the coils successively in front of certain sections of the core to keep it in motion, substantially as described.

4. A motor, comprising a series of hollow coils, a circular or ring core passing through the center of said coils, means extending through the cores for guiding the core properly in its movement through the coils, means for energizing the coils in correspondence with the action of the core, and means for taking power from the moving core without interfering with its action or with the coils, substantially as described.

5. A motor, comprising a series of hollow coils, arranged in a ring, means for rigidly supporting the same in position, a track extending through the centers of the coils, and a core running upon the said track, together with means for energizing the coils in accordance with the movement of the core, substantially as described.

6. A motor, comprising a series of coils having central apertures, tracks extending through said apertures, a ring core traveling on said track, wheels supporting the said ring upon the said track, and means engaging the periphery of the ring for communicating its motion to other mechanism, substantially as described.

7. A motor, comprising a series of coils having central apertures, a core traveling through the same, a continuous guiding and supporting means for the core extending through the coils, said core being formed of active and inactive sections, and means for energizing one or more of the coils ahead of the active sections to rotate the said core-ring, substantially as described.

8. A motor, comprising a series of hollow coils, a ring core passing through said coils, a continuous track for said core extending through all the coils, means for energizing the coils so as to rotate the core, a belt engaging the said core, the said belt passing in at one side of the machine and out from the core at another point, the pull of the belt tending to reduce the friction of the core-ring by supporting some of its weight, substantially as described.

9. A motor, comprising a series of hollow magnetic coils, a ring core traveling through the same, a continuous track extending through and between said coils for supporting and guiding the core and means engaging the periphery of said ring for operating shafting, the said shafting extending to a suitable point for actuating other mechanism, substantially as described.

10. A motor, comprising a number of solenoid-coils, a continuous core or plunger traveling through said coils, a guiding and supporting track over which said core travels, a rack or gear on the periphery of said core, gearing meshing with the said rack for imparting movement to other mechanism, and a commutator operated by said gearing for controlling the application of electrical energy to the solenoid-coils, substantially as described.

11. A motor, comprising a number of solenoid-coils, a traveling core or plunger moving through the said coils, means for supporting the core at every point in its path through the coils, gearing engaging and receiving movement from the said core, a commutator operated by the said gearing, a series of brushes connected with the solenoid-coils, the action of the commutator being such as to energize the coils in advance of the magnetic sections of the core, substantially as described.

12. A motor, comprising a series of solenoid-coils, a frame supporting the same, arms extending from said frame between the coils, tracks secured to the ends of said arms, a core traveling upon said track, wheels supporting the said core upon the track, the said wheels being countersunk in the side surfaces of the core so as to not offer obstruction to anything outside the core, and means for energizing the solenoids to actuate the said core, substantially as described.

13. A motor comprising a series of coils, a core traveling through the same and provided with a belt-engaging portion on a part of its periphery, a gear also upon the periphery of said core to one side of the belt-engaging portion thereof, means for receiving motion from the core both from the belt-engaging portion and from the said rack or gear, and means for energizing the coils so as to cause the rotation of the traveling core, substantially as described.

14. A motor, comprising a series of solenoid-coils, a ring core traveling through the same, a commutator for controlling the action of the core, mechanism connecting the traveling core with the said commutator, the commutator having two sections for causing the core to travel in opposite directions, brushes for engaging the commutators, the said brushes being connected with the solenoids, and means for moving the commutator-sections back and forth beneath the brushes for reversing the movement of the motor, substantially as described.

15. A motor, comprising a series of hollow solenoid-coils, a core traveling through the same, a commutator for controlling the action of the solenoids, the said commutator having active sections in circuit and insulated sections, a considerable gap being left between the active and inactive sections, and a bridging-block inserted in said gap and insulated from the commutator for properly carrying the brushes from the active to the inactive sections without communicating current to said inactive sections, substantially as described.

16. A motor, comprising a series of solenoid-coils, a core traveling through the same, a commutator for controlling the action of the solenoids, brushes engaging the commutator, a controlling mechanism, comprising a ring carrying a series of contacts, contacts projecting from each of the brushes, the contacts carried by the ring being connected with each of the solenoids, and means for moving the said ring so as to bring its contacts into or out of engagement with one or more or all of the said brush-contacts in accordance with the load and speed of the motor, substantially as described.

17. A motor, comprising a series of solenoid-coils, a core traveling through the same, a commutator, brushes engaging the said commutator, a brush being provided for each solenoid-coil, contact-points projecting from each brush, a controlling member carrying contacts of different lengths, means for moving the governor member back and forth so that some or all of its contacts may engage some or all of the contacts of the brushes, the contacts of the governor member being electrically connected with each of the solenoids, substantially as described.

18. In a motor, the combination with a series of solenoid-coils, a traveling core passing through the same, a track guiding the said core, wheels supporting the said core upon the said track, and ball-bearings interposed between the said wheels and the core for preventing undue friction in the movement of the said core, substantially as described.

In testimony whereof I hereunto affix my signature in presence of two witnesses.

SABIN A. GIBBS.

Witnesses:
E. S. PRENTICE,
ELLIS LEWIS GARRETSON.